United States Patent
Li et al.

(10) Patent No.: US 9,047,148 B2
(45) Date of Patent: Jun. 2, 2015

(54) PIPELINED VECTORING-MODE CORDIC

(75) Inventors: Zhibin Li, Shanghai (CN); Yao Zhao, Shanghai (CN)

(73) Assignee: LSI Corporation, Milpitas, CA (US)

( * ) Notice: Subject to any disclaimer, the term of this patent is extended or adjusted under 35 U.S.C. 154(b) by 406 days.

(21) Appl. No.: 13/525,170

(22) Filed: Jun. 15, 2012

(65) Prior Publication Data
US 2013/0335853 A1 Dec. 19, 2013

(51) Int. Cl.
  *G06F 7/00* (2006.01)
  *G06F 7/544* (2006.01)
  *G11B 5/09* (2006.01)
  *G11B 5/55* (2006.01)

(52) U.S. Cl.
  CPC .............. *G06F 7/5446* (2013.01); *G11B 5/09* (2013.01); *G11B 5/5547* (2013.01); *G06F 2207/3884* (2013.01)

(58) Field of Classification Search
None
See application file for complete search history.

(56) References Cited

U.S. PATENT DOCUMENTS

| | | | |
|---|---|---|---|
| 4,231,102 A * | 10/1980 | Barr et al. | 708/406 |
| 4,646,173 A | 2/1987 | Kammeyer et al. | |
| 6,385,632 B1 * | 5/2002 | Choe et al. | 708/270 |
| 6,480,871 B1 | 11/2002 | Phatak | |
| 7,400,464 B1 * | 7/2008 | Katchmart | 360/51 |
| 2004/0161055 A1 * | 8/2004 | Sinha | 375/322 |
| 2006/0167962 A1 * | 7/2006 | Torosyan | 708/271 |
| 2006/0200510 A1 | 9/2006 | Wang et al. | |

OTHER PUBLICATIONS

Duprat et al., "The Cordic Algorithm: New Results for Fast VLSI Implementation", IEEE Transactions on Computers, vol. 42, No. 2, pp. 168-178 (Feb. 1993).

Hu, "CORDIC-based VLSI Architectures for Digital Signal Processing", IEEE Signal Processing Magazine, pp. 16-35 (Jul. 1992).

Phatak, "Double Step Branching CORDIC: A New Algorithm for Fast Sine and Cosine Generation," IEEE Transactions on Computers, vol. 47, No. 5, pp. 587-602 (May 1998).

Singh et al., "Comparison of Branching CORDIC Implementations", Application-Specific Systems, Architectures, and Processors, 2003, Proceedings, IEEE Int. Conf., 15 pages. (Jun.

Voider, "The CORDIC Trigonometric Computing Technique", IRE Trans.Electronic Computers, vol. EC-8, No. 3, pp. 330-34 (Sep. 1959).

* cited by examiner

*Primary Examiner* — Michael D Yaary
(74) *Attorney, Agent, or Firm* — Hamilton DeSanctis & Cha

(57) ABSTRACT

Various embodiments of the present invention provide pipelined vectoring-mode CORDICS including a coordinate converter operable to yield a converted vector based on an input vector, wherein an x coordinate value of the converted vector is positive, a y coordinate value of the converted vector is positive, and the x coordinate value is greater than or equal to the y coordinate value, a pipeline of vector rotators operable to perform a series of successive rotations of the converted vector to yield a rotated vector and to store rotation directions of the series of successive rotations, and at least one lookup table operable to yield an angle of rotation based on the rotation directions.

20 Claims, 5 Drawing Sheets

PIPELINED VECTORING-MODE CORDIC

BACKGROUND

A COordinate Rotation DIgital Computer (CORDIC) is an electronic circuit or executable code that can be used for the computation of mathematical operations such as trigonometric functions, multiplication and division operations and data type conversion. Such a device may be used, for example, in the processing of data retrieved from storage systems or received by cellular telephone systems and radio transmission systems. In each of the systems data is transferred from a sender to a receiver via some medium. For example, in a storage system, data is sent from a sender (i.e., a write function) to a receiver (i.e., a read function) via a storage medium. As information is stored or transmitted in the form of digital data, mathematical operations that may be performed by a CORDIC are used during the detection or decoding of data. A CORDIC enables these mathematical operations to be performed without a hardware multiplier, and may be implemented using very large scale integration (VLSI) techniques relatively easily.

A CORDIC iteratively computes the rotation of a vector in a Cartesian coordinate system and evaluates the length and angle of the rotated vector. A CORDIC may operate in a rotation mode or a vectoring mode. In the rotation mode, the coordinate components of a vector and an angle of rotation are specified and the coordinate components of the original vector, after rotation through a given angle, are computed. In other words, a vector is specified by X and Y coordinates, the vector is rotated through a specified angle, and the X and Y coordinates of the resulting vector are yielded. In the vectoring mode, the coordinate components of a vector are given and the magnitude and angular argument of the original vector are computed. The vector is rotated until the angular argument is zero so that the total amount of rotation required is the negative of the original argument. In other words, the input vector is rotated to the X axis while recording the angle required to make the rotation in order to compute the magnitude and angular argument of the original vector.

A CORDIC is typically employed in a system with limited hardware resources in which a hardware multiplier is not available. A need therefore exists for a more computationally efficient and compact CORDIC.

BRIEF SUMMARY

Various embodiments of the present invention provide pipelined vectoring-mode CORDICS including a coordinate converter operable to yield a converted vector based on an input vector, wherein an x coordinate value of the converted vector is positive, a y coordinate value of the converted vector is positive, and the x coordinate value is greater than or equal to the y coordinate value, a pipeline of vector rotators operable to perform a series of successive rotations of the converted vector to yield a rotated vector and to store rotation directions of the series of successive rotations, and at least one lookup table operable to yield an angle of rotation based on the rotation directions.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various embodiments of the present invention provide an area efficient pipelined vectoring mode CORDIC for performing mathematical calculations such as trigonometric functions, multiplication and division operations and data type conversions such as rectangular to polar coordinate conversions. A pipelined vectoring-mode CORDIC is disclosed below, followed by an area efficient pipelined vectoring-mode CORDIC that optimizes pre-processing of vector coordinates and that uses angle lookup tables for rotation directions to reduce the implementation area. The pipeline structure may be implemented in a very large scale integration (VLSI) circuit to support high throughput, sacrificing silicon area for the high throughput to some extent, but reducing hardware resource usage in the area efficient pipelined vectoring-mode CORDIC.

The general form of one CORDIC iteration is set forth in equations 1-3 below:

$$x_{i+1} = x_i - m \cdot \mu_i \cdot y_i \cdot \delta_{m,i} \quad \text{(Eq 1)}$$

$$y_{i+1} = y_i + \mu_i \cdot x_i \cdot \delta_{m,i} \quad \text{(Eq 2)}$$

$$z_{i+1} = z_i - \mu_i \cdot \alpha_{m,i} \quad \text{(Eq 3)}$$

where $(x_i, y_i)^T$ is the vector before a rotation, $(x_{i+1}, y_{i+1})^T$ is the vector after a rotation, $\alpha_{m,i}$ is the rotation angle and $z_i$ tracks the angle rotation, m is 1 in the circular coordinate system, 0 in the linear coordinate system and −1 in the hyperbolic coordinate system. The rotation direction is steered by $\mu_i$ in $\{1, -1\}$, and $\delta_{m,i} = d^{-s_{m,i}}$, where d indicates the radix of the employed number system and $s_{m,i}$ is an integer number of shift sequence.

In a special case CORDIC with radix 2 and a circular coordinate system, an iteration is set forth in equations 4-6 below:

$$x_{i+1} = x_i + \text{sign}(x_i) \cdot \text{sign}(y_i) \cdot y_i \cdot 2^{-i} \quad \text{(Eq 4)}$$

$$y_{i+1} = y_i - \text{sign}(x_i) \cdot \text{sign}(y_i) \cdot x_i \cdot 2^{-i} \quad \text{(Eq 5)}$$

$$z_{i+1} = z_i + \text{sign}(x_i) \cdot \text{sign}(y_i) \cdot a\tan(2^{-i}) \quad \text{(Eq 6)}$$

where $(x_i, y_i)^T$ is the vector before a rotation, $(x_{i+1}, y_{i+1})^T$ is the vector after a rotation. If $z_0$ is defined as 0 and a coordinate conversion is performed to make $x_0 \geq 0$ (a definition and conversion that can be compensated for at the end of the CORDIC calculation), the iteration can be simplified to equations 7-9 below:

$$x_{i+1} = x_i + \text{sign}(y_i) \cdot y_i \cdot 2^{-i} \quad \text{(Eq 7)}$$

$$y_{i+1} = y_i - \text{sign}(y_i) \cdot x_i \cdot 2^{-i} \quad \text{(Eq 8)}$$

$$z_{i+1} = z_i + \text{sign}(y_i) \cdot a\tan(2^{-i}) \quad \text{(Eq 9)}$$

For a vectoring mode CORDIC, the vector is rotated such that $y_i \to 0$. Given the iteration number n, the calculated phase $z_n$ and the calculated magnitude $K \cdot x_n$ can be obtained, where $K = \Pi \cos(a\tan(2^{-i}))$.

Figure 1:
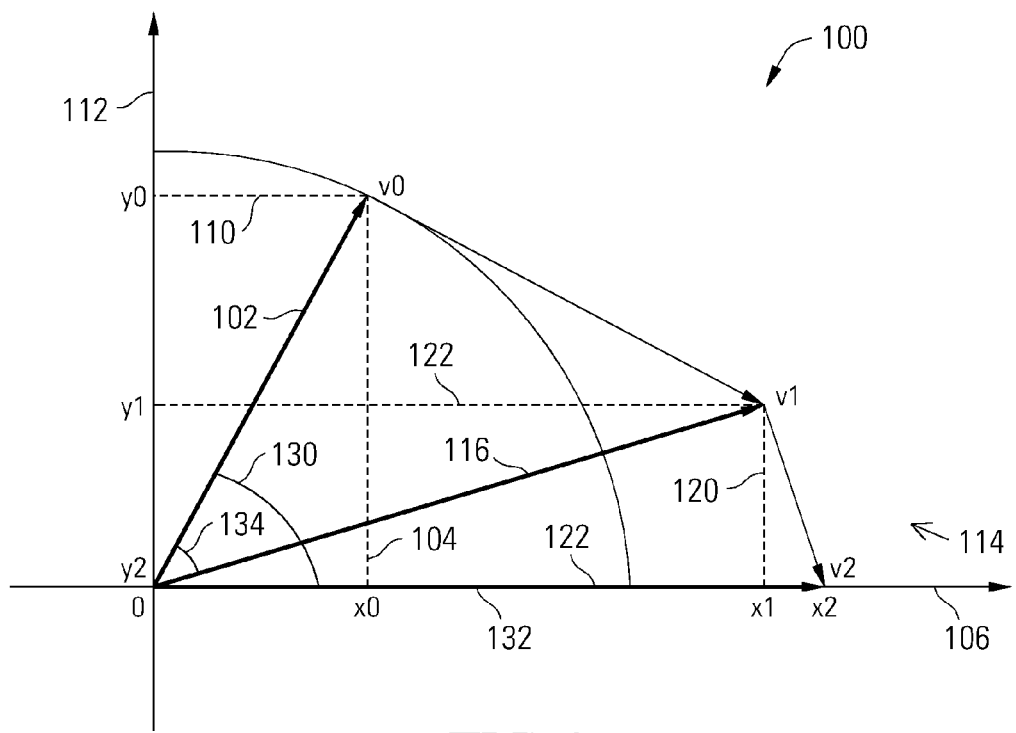
FIG. 1 depicts example vector rotations performed in the pipelined vectoring mode CORDIC with radix-2, a circular coordinate system, two iterations and where $z_0$ is 0 and $x_0 \geq 0$.

For example, turning to FIG. 1, a graph 100 of example vector rotations are illustrated as they may be performed in a pipelined vectoring mode CORDIC with radix-2, a circular coordinate system, two iterations and where $z_0$ is 0 and $x_0 \geq 0$. An initial vector V0 102 has an $x_0$ coordinate 104 on an X-axis 106 and a $y_0$ coordinate 110 on a Y-axis 112, which in this case lies in quadrant I 114 in which both X and Y are greater than 0. The vector 102 is iteratively rotated until it lies upon the X-axis 106 with y=0, in this example taking two iterations. The first iteration yields vector V1 116 having an $x_1$ coordinate 120 and a $y_1$ coordinate 122. The second iteration yields vector V2 124 having an $x_2$ coordinate 126 and $y_2$=0. Given the initial $x_0$ and $y_0$ coordinates 104 and 110, the CORDIC calculates the final angle β 130 and final magnitude $K \cdot x_2$ 132, where $\beta = a\tan(2^0) + a\tan(2^{-1})$ and where $K = \Pi \cos(a\tan(2^{-i})) = \cos(a\tan(2^0)) \cdot \cos(a\tan(2^{-1}))$.

Figure 2:
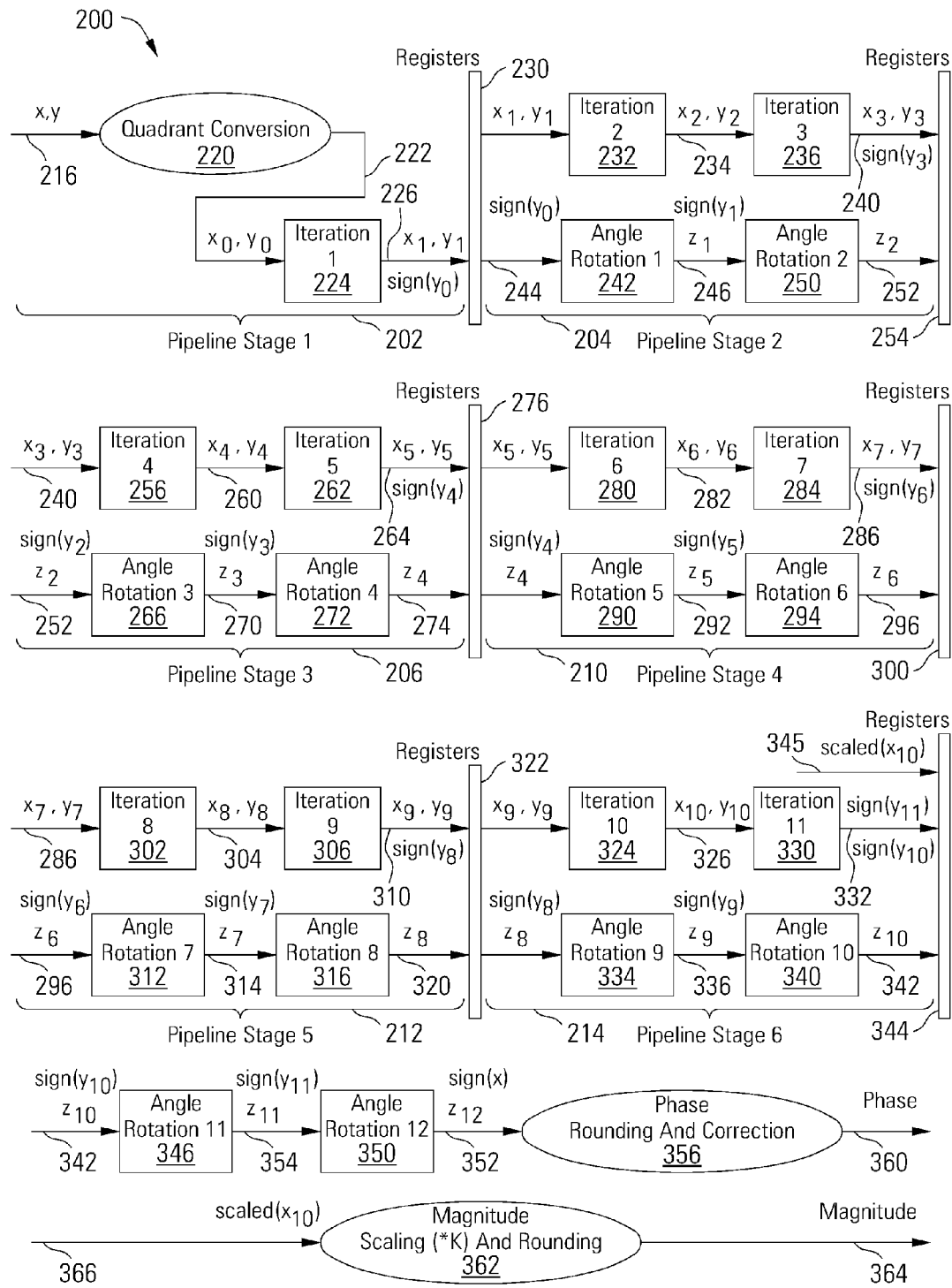
FIG. 2 depicts a pipelined vectoring mode CORDIC.

Turning to FIG. 2, an example pipelined vectoring mode CORDIC 200 is depicted with six pipeline stages 202, 204, 206, 210, 212 and 214 performing 11 iterations (or n=11). The pipelines may be implemented, for example, using a series of logic blocks designed with VLSI techniques and embodied in an integrated circuit. An x,y coordinate for an initial vector is received at an input 216 to the pipelined vectoring mode CORDIC 200 and passes through a quadrant converter 220 in the first pipeline stage 202 that yields the absolute value of the initial x coordinate and a copy of the initial y coordinate, resulting in an $x_0$, $y_0$ coordinate 222. By taking the absolute value of the initial x coordinate from input 216, the phase of the initial vector falls within the range from $-\pi/2$ to $\pi/2$. A first iteration block 224 is also included in the first pipeline stage 202, comprising any circuit or executable code suitable to apply equations 7 and 8, such as a combination of shifters and adders. (Iteration blocks comprising circuits or code are also referred to herein generally as "iterations" or as vector rotators.) Based upon the disclosure provided herein, one of ordinary skill in the art will recognize a variety of circuitry or code that may be used to apply equations 7-9 in iteration blocks (e.g., 224) of the pipeline stages (e.g., 202). The first iteration 224 yields a rotated vector with coordinates $x_1$, $y_1$ 226 as a rotated version of the previous vector with coordinates $x_0$, $y_0$ 222. Registers 230 store the $x_1$, $y_1$ coordinates 226 and the sign of the $y_0$ coordinate as the result of the first pipeline stage 202.

The second pipeline stage 204 includes a second iteration 232 that applies equations 7 and 8 to coordinates $x_1$, $y_1$ 226 to rotate the vector to coordinates $x_2$, $y_2$ 234, and a third iteration 236 that applies equations 7 and 8 to coordinates $x_2$, $y_2$ 234 to rotate the vector to coordinates $x_3$, $y_3$ 240. The second iteration 232 may obtain coordinates $x_1$, $y_1$ 226 directly from the output of the first iteration 224 in pipeline fashion or may retrieve them from the registers 230. The second pipeline stage 204 also includes a first angle rotation block 242 (also referred to herein generally as an "angle rotation") which applies equation 9 to the sign 244 of the $y_0$ coordinate. The angle rotation 242 calculates $z_1$ 246 using equation 9 based on the sign of the $y_0$ coordinate and on the $z_0$ value, which in the pipelined vectoring mode CORDIC 200 is defined as 0. The sign of the $y_0$ coordinate may be obtained from first iteration 224, which determines the sign of the $y_0$ coordinate in the course of applying equations 7 and 8. The sign of the $y_0$ coordinate may alternatively be retrieved from registers 230. The second pipeline stage 204 also includes a second angle rotation 250 which applies equation 9 to the sign of the $y_1$ coordinate, obtained from second iteration 232, yielding $z_2$ 252. The output of second pipeline stage 204 is stored in registers 254, including coordinates $x_3$, $y_3$ 240, the sign of coordinate $y_3$, and $z_2$ 252. Again, z tracks the rotation angles.

Additional pipeline stages may repeat the operation performed by second pipeline stage 204, increasing the resolution or precision of the result as additional stages are added. In the example of FIG. 2, the pipelined vectoring mode CORDIC 200 includes six pipeline stages 202, 204, 206, 210, 212 and 214 to perform 11 iterations.

The third pipeline stage 206 includes a fourth iteration 256 that applies equations 7 and 8 to coordinates $x_3$, $y_3$ 240 to rotate the vector to coordinates $x_4$, $y_4$ 260, and a fifth iteration 262 that applies equations 7 and 8 to coordinates $x_4$, $y_4$ 260 to rotate the vector to coordinates $x_5$, $y_5$ 264. The third pipeline stage 206 also includes a third angle rotation 266 that applies equation 9 to the sign of the $y_2$ coordinate and to $z_2$ 252 to yield $z_3$ 270, and a fourth angle rotation 272 that applies equation 9 to the sign of the $y_3$ coordinate and to $z_3$ 270 to yield $z_4$ 274. Registers 276 store the output of third pipeline stage 206, including coordinates $x_5$, $y_5$ 264, the sign of coordinate $y_4$, and rotation angle $z_4$ 274.

The fourth pipeline stage 210 includes a sixth iteration 280 that applies equations 7 and 8 to coordinates $x_5$, $y_5$ 264 to rotate the vector to coordinates $x_6$, $y_6$ 282, and a seventh iteration 284 that applies equations 7 and 8 to coordinates $x_6$, $y_6$ 282 to rotate the vector to coordinates $x_7$, $y_7$ 286. The fourth pipeline stage 210 also includes a fifth angle rotation 290 that applies equation 9 to the sign of the $y_4$ coordinate and to $z_4$ 274 to yield $z_5$ 292, and a sixth angle rotation 294 that applies equation 9 to the sign of the $y_5$ coordinate and to $z_5$ 292 to yield $z_6$ 296. Registers 300 store the output of fourth pipeline stage 210, including coordinates $x_7$, $y_7$ 286, the sign of coordinate $y_6$, and rotation angle $z_6$ 296.

The fifth pipeline stage 212 includes an eighth iteration 302 that applies equations 7 and 8 to coordinates $x_7$, $y_7$ 286 to rotate the vector to coordinates $x_8$, $y_8$ 304, and a ninth iteration 306 that applies equations 7 and 8 to coordinates $x_8$, $y_8$ 304 to rotate the vector to coordinates $x_9$, $y_9$ 310. The fifth pipeline stage 212 also includes a seventh angle rotation 312 that applies equation 9 to the sign of the $y_6$ coordinate and to $z_6$ 296 to yield $z_7$ 314, and an eighth angle rotation 316 that applies equation 9 to the sign of the $y_7$ coordinate and to $z_7$ 314 to yield $z_8$ 320. Registers 322 store the output of fifth pipeline stage 212, including coordinates $x_9$, $y_9$ 310, the sign of coordinate $y_8$, and rotation angle $z_8$ 320.

The sixth pipeline stage 214 includes a tenth iteration 302 that applies equations 7 and 8 to coordinates $x_9$, $y_9$ 310 to rotate the vector to coordinates $x_{10}$, $y_{10}$ 326, and an eleventh iteration 330 that applies equations 7 and 8 to coordinates $x_{10}$, $y_{10}$ 326 to rotate the vector to obtain the sign 332 of the $y_{11}$ coordinate. The sixth pipeline stage 214 also includes a ninth angle rotation 334 that applies equation 9 to the sign of the $y_8$ coordinate and to $z_8$ 320 to yield $z_9$ 336, and a tenth angle rotation 340 that applies equation 9 to the sign of the $y_9$ coordinate and to $z_9$ 336 to yield $z_{10}$ 342. Registers 344 store the output of sixth pipeline stage 214, including the sign of coordinate $y_{10}$, the sign 332 of coordinate $y_{11}$ and rotation angle $z_{10}$ 342. In the final pipeline stage (e.g., 214), a scaled version of the final x coordinate is also stored in the registers 344, in this case a scaled version of $x_{10}$ 345. (To maintain the intermediate variable accuracy, variable X is left shifted or multiplied by $2^n$ and is then scaled to return to the original resolution.)

After the final pipeline stage, in this case sixth pipeline stage 214, the final phase and magnitude may be calculated using further corrections and post-processing. An eleventh angle rotation 346 and twelfth angle rotation 350 may be used to yield rotation angle $z_{12}$ 352 using equation 9 based on $z_{10}$ 342, the signs of the $y_{10}$ and $y_{11}$ coordinates from registers 344, and using intermediate value $z_{11}$ 354. A phase rounding and correction block 356 compensates for the quadrant converter 220 based on the sign of the initial x coordinate at input 216. Generally, phase rounding and correction block 356 applies the following algorithm to compensate for quadrant converter 200: if (x<0 and y>0) output phase=CORDIC output−180 degree; else if (x<0 and y<0) output phase=CORDIC output+180 degree; else output phase=CORDIC output. Phase rounding and correction block 356 also rounds the rotation angle $z_{12}$ 352 to the desired precision, yielding the output phase 360. A magnitude scaling and rounding block 362 calculates the output magnitude 364 based on the scaled $x_{10}$ coordinate 366 as $K*x_n$, where $K=\Pi \cos(a\tan(2^{-i}))$, and rounding the resulting magnitude to the desired precision. For example, with three iterations, K would be $\cos(a\tan(2^0))*\cos(a\tan(2^{-1}))*\cos(a\tan(2^{-2}))$.

The example of FIG. 1, if performed in the pipelined vectoring mode CORDIC 200 of FIG. 2, has a first rotation angle 134 of a $\tan(1/20)$ or $\pi/4$ (45 degrees). The calculated phase range is $-\pi/2 \sim \pi/2$ (−180 degrees to +180 degrees). If n=11 as in the example of FIG. 2 (which would have additional increasingly small rotations not shown in FIG. 1), the magnitude scaling factor K=0.607253, implemented as (½+⅛−1/64−1/512).

Figure 3:
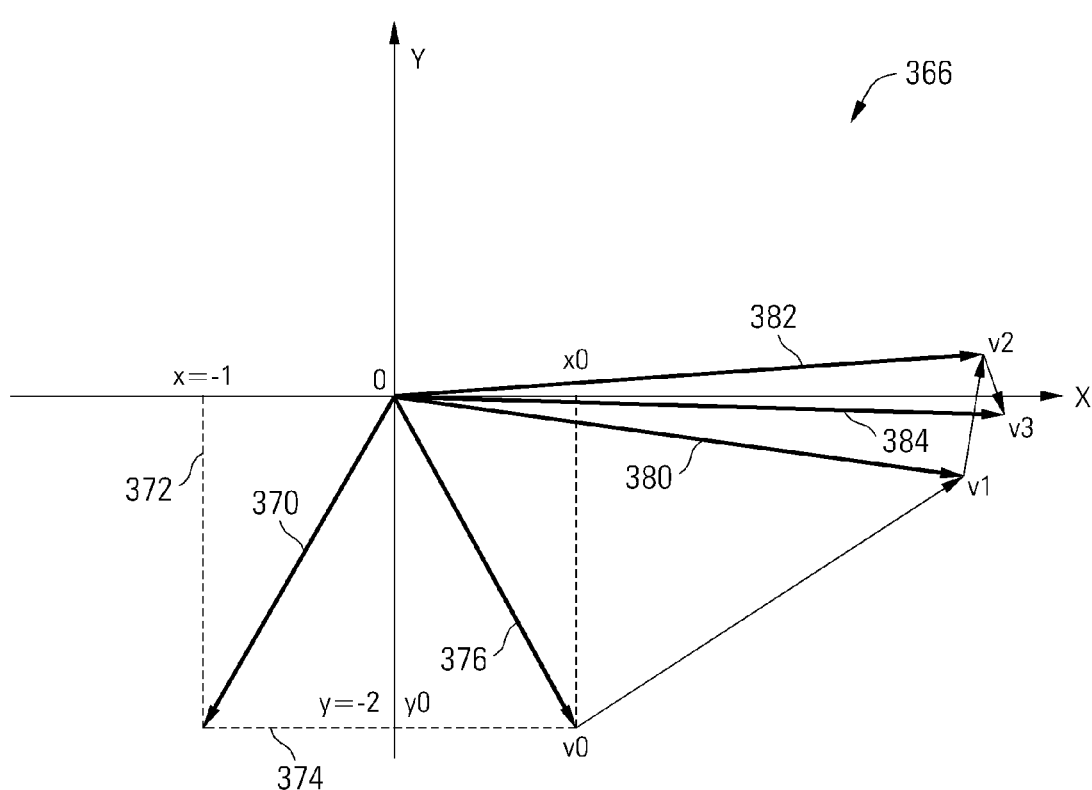
FIG. 3 depicts example vector rotations performed in the pipelined vectoring mode CORDIC of FIG. 2.

Another example is depicted in the graph 366 FIG. 3, showing the first three vector rotations performed in the pipelined vectoring mode CORDIC 200. An input vector 370 has an initial x coordinate 372 of −1 and an initial y coordinate 374 of −2. The quadrant conversion 220 mirrors the input vector 370 taking the absolute value of the initial x coordinate 372 such that the phase of the resulting vector $v_0$ 376 falls within the range from $-\pi/2$ to $\pi/2$, with $x_0, y_0$ coordinates (1, −2). The first iteration 224 calculates the coordinates of vector $v_1$ 380 as (3, −1) using equations 7 and 8, assuming $v_i=(x_i, y_i)$. The second iteration 232 calculates the coordinates of vector $v_2$ 382 as (3.5, 0.5), and the third iteration 236 calculates the coordinates of vector $v_3$ 384 as (3.625, −0.375). Because the sign of coordinate $y_0$ is negative, the initial rotation $z_0 = -a\tan(2^0)$, or −45 degrees. The rotation angle calculated by first angle rotation 242 is $z_1 = z_0 - a\tan(2^{-1}) = -71.5$ degree, with the rotation direction being negative based on the sign of $y_0$, and the rotation angle calculated by second angle rotation 250 is $z_2 = z_1 + a\tan(2^{-2}) = -57.5$ degree, with the rotation angle being positive based on the sign of $y_1$.

After eleven iterations, $y_{11}=0.003076$ (very close to 0), $x_{11}=3.682266$ and $z_{11}=-63.45$ degree. Given the initial x coordinate as COS and the initial y coordinate as SIN, the magnitude of the initial vector is $\sqrt{x^2+y^2}$, and the output magnitude of the CORDIC should be very close to this value. From $x_{12}$, the output magnitude=$K*x_{11}$=0.607253*3.682266=2.2361, a value very close to $\sqrt{1\times1+2\times2}$, the actual magnitude of the initial vector (−1,−2). Assuming the angle range is from $-\pi/2$ to $\pi/2$, from $z_{12}$ and the quadrant conversion information, the final angle for the vector (−1, −2) is calculated as 63.45−180=−116.55 degree. In the pipelined vectoring mode CORDIC 200, the rotation index starts from 0 and the angle is accumulated after each rotation. Thus, $z_1$ through $z_{12}$ is calculated in every iteration using the corresponding index from 0 to 11 correspondingly.

Assuming the angle is quantized as a 12-bit signed number and there are 2 iterations in each pipeline stage, the pipelined vectoring mode CORDIC 200 includes 12*5 or 60 D flip-flops (DFFs) for the intermediate angle registers.

Figure 4:
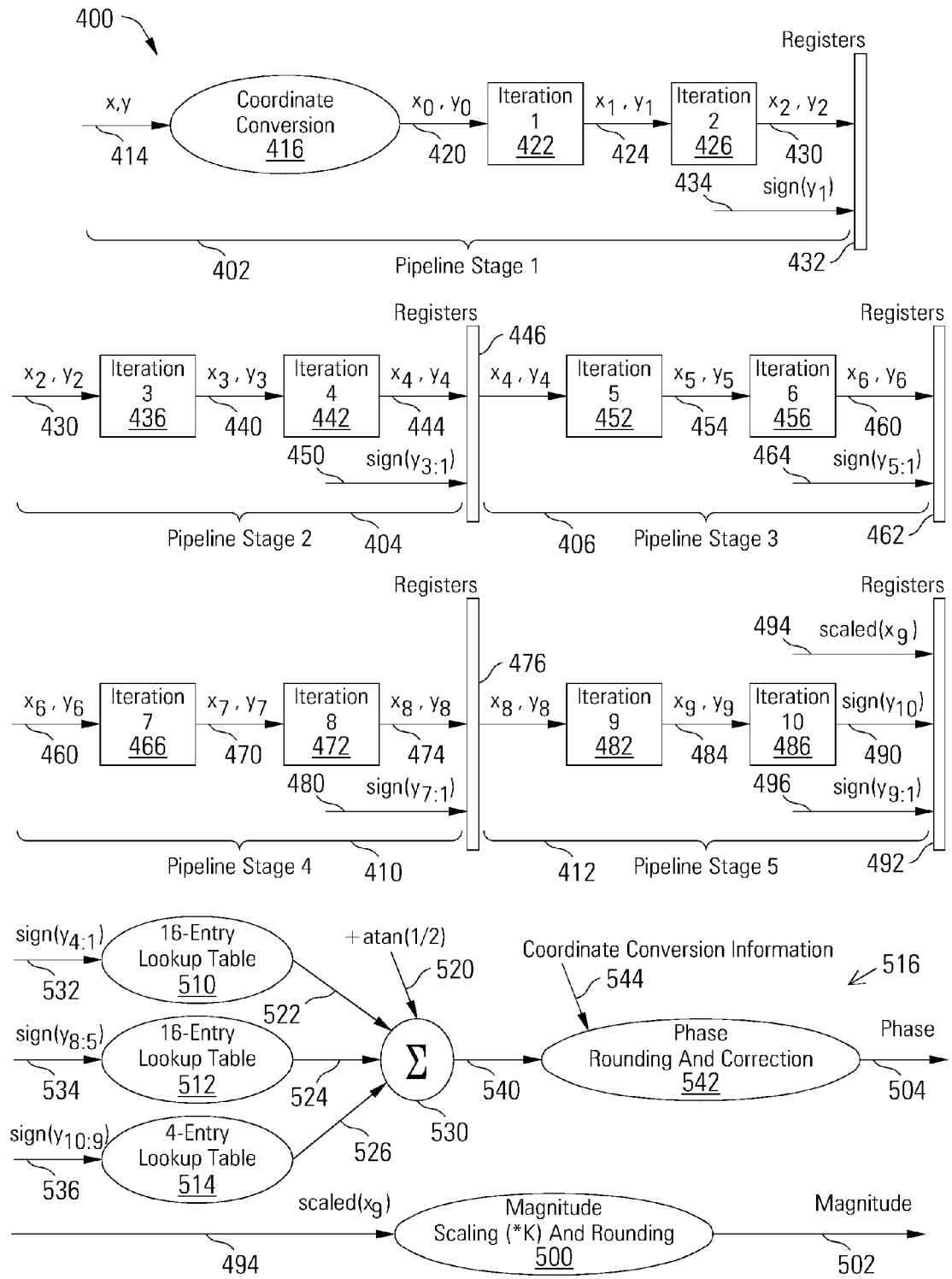
FIG. 4 depicts an area efficient pipelined vectoring mode CORDIC.

Turning to FIG. 4, an example of an area-efficient pipelined vectoring mode CORDIC 400 is depicted which implements equations 7-9 to perform a CORDIC operation and that optimizes pre-processing of vector coordinates and uses angle lookup tables for rotation directions to reduce the implementation area.

In some embodiments, the pipelined vectoring mode CORDIC 400 converts the initial x, y coordinates such that $x_0$ and $y_0$ are both positive and $x_0>y_0$, so that the first rotation angle is positive a tan(½). This enables the pipelined vectoring mode CORDIC 400 to skip the angle rotation for $\pi/4$. The example pipelined vectoring mode CORDIC 400 includes five pipeline stages 402, 404, 406, 410 and 412 performing 10 iterations. By skipping the angle rotation for $\pi/4$, the pipelined vectoring mode CORDIC 400 is able to provide the same resolution as the 11 iterations of the pipelined vectoring mode CORDIC 200. As with the pipelined vectoring mode CORDIC 200, the number of pipeline stages in the pipelined vectoring mode CORDIC 400 may be selected to provide the desired resolution or precision in the results. The pipelines may be implemented, for example, using a series of logic blocks designed with VLSI techniques and embodied in an integrated circuit.

In some embodiments, the pipelined vectoring mode CORDIC 400 records rotation directions and retrieves the final angle result from lookup tables, given that the accumulative angle is unique when the rotation directions of each iteration are determined.

The pipelined vectoring mode CORDIC 400 receives the coordinates x,y of an initial vector at an input 414 and performs a coordinate conversion 416 in the first pipeline stage 402. The coordinate conversion 416 or coordinate converter converts the initial x, y coordinates such that $x_0$ and $y_0$ are both positive and $x_0>y_0$, for example using circuits or code to implement an absolute value generator and a comparator. The coordinate conversion 416 yields an output 420 with an $x_0$ as the absolute value of x at input 414 and $y_0$ as the absolute value of y at input 414, and with the values of $x_0$ and $y_0$ swapped if needed so that $x_0>y_0$.

A first iteration 422 in the first pipeline stage 402 applies equations 7 and 8 to the $x_0, y_0$ coordinates 420, yielding $x_1, y_1$ coordinates 424 as a rotated version of the previous vector with coordinates $x_0, y_0$ 420. The iteration blocks (e.g., 422) may comprise any circuit or executable code suitable to apply equations 7 and 8, such as a combination of shifters and adders. Based upon the disclosure provided herein, one of ordinary skill in the art will recognize a variety of circuitry or code that may be used to apply equations 7 and 8 in iteration blocks. A second iteration 426 in the first pipeline stage 402 applies equations 7 and 8 to the $x_1, y_1$ coordinates 424, yielding $x_2, y_2$ coordinates 430. Registers 432 store the output of the first pipeline stage 402, including the $x_2, y_2$ coordinates 430 and the sign 434 of the $y_1$ coordinate. Registers (e.g., 432) store intermediate x and y coordinates for the next pipeline stage, enabling the pipelined vectoring mode CORDIC 400 to be pipelined to support high throughput.

Notably, the pipelined vectoring mode CORDIC 400 does not calculate the angle rotations in each of the pipeline stages 402, 404, 406, 410 and 412, unlike the pipelined vectoring mode CORDIC 200 which calculates the rotation angles in the pipeline stages and accumulates the resulting angle. Rather, the pipelined vectoring mode CORDIC 400 records a single bit representing the sign of the y coordinate and thus of the rotation direction for each iteration, using the sign bits to retrieve the final angle from one or more lookup tables at the end of the pipeline.

The second pipeline stage 404 includes a third iteration 436 that applies equations 7 and 8 to coordinates $x_2$, $y_2$ 430 to rotate the vector to coordinates $x_3$, $y_3$ 440, and a fourth iteration 442 that applies equations 7 and 8 to coordinates $x_3$, $y_3$ 440 to rotate the vector to coordinates $x_4$, $y_4$ 444. Registers 446 store the output of the first pipeline stage 404, including the $x_4$, $y_4$ coordinates 444 and the sign bits 450 of the $y_{[3:1]}$ coordinates.

The third pipeline stage 406 includes a fifth iteration 452 that applies equations 7 and 8 to coordinates $x_4$, $y_4$ 444 to rotate the vector to coordinates $x_5$, $y_5$ 454, and a sixth iteration 456 that applies equations 7 and 8 to coordinates $x_5$, $y_5$ 454 to rotate the vector to coordinates $x_6$, $y_6$ 460. Registers 462 store the output of the third pipeline stage 406, including the coordinates $x_6$, $y_6$ 460 and the sign bits 465 of the $y_{[5:1]}$ coordinates.

The fourth pipeline stage 410 includes a seventh iteration 466 that applies equations 7 and 8 to coordinates $x_6$, $y_6$ 460 to rotate the vector to coordinates $x_7$, $y_7$ 470, and an eighth iteration 472 that applies equations 7 and 8 to coordinates $x_7$, $y_7$ 470 to rotate the vector to coordinates $x_8$, $y_8$ 474. Registers 476 store the output of the fourth pipeline stage 410, including the coordinates $x_8$, $y_8$ 474 and the sign bits 480 of the $y_{[7:1]}$ coordinates.

The fifth pipeline stage 412 includes a ninth iteration 482 that applies equations 7 and 8 to coordinates $x_8$, $y_8$ 474 to rotate the vector to coordinates $x_9$, $y_9$ 484, and a tenth iteration 486 that applies equations 7 and 8 to coordinates $x_9$, $y_9$ 484 to rotate the vector to obtain the sign 490 of the $y_{10}$ coordinate. Registers 492 store the output of the fifth pipeline stage 412, including the sign 490 of the $y_{10}$ coordinate, a scaled version 494 of the $x_9$ coordinate, and the sign bits 496 of the $y_{[9:1]}$ coordinates. (To maintain the intermediate variable accuracy, variable X is left shifted or multiplied by $2^n$ and is then scaled to return to the original resolution.)

After the final pipeline stage, in this case fifth pipeline stage 412, the final phase and magnitude may be calculated using further corrections and post-processing. A magnitude scaling and rounding block 500 calculates the output magnitude 502 based on the scaled $x_9$ coordinate 494 as $K*x_n$, where $K=\Pi \cos(a \tan(2^{-i}))$, and rounding the resulting magnitude to the desired precision. In this example, the magnitude scaling factor K=0.858785, implemented as (1−⅛−1/64−1/2048). Because the pipelined vectoring mode CORDIC 400 has one less iteration than the pipelined vectoring mode CORDIC 200 disclosed above to achieve the same resolution, the K term will have one less multiplied cos term and will thus be larger. Also because the pipelined vectoring mode CORDIC 400 has one less iteration than the pipelined vectoring mode CORDIC 200, the x term will undergo one fewer iteration and will have a smaller value than the x term in the pipelined vectoring mode CORDIC 200, compensated by the larger K term. The word width of $x_i$ can thus be reduced, increasing the area efficiency of the pipelined vectoring mode CORDIC 400 without degrading performance. Assuming the inputs x and y are 13-bit fixed-point signed numbers, the word width of the x values in the CORDICS 200 and 400 is summarized in the table below:

| sequence | | shift | | | | | | | | | |
|---|---|---|---|---|---|---|---|---|---|---|---|
| | | 0 | 1 | 2 | 3 | 4 | 5 | 6 | 7 | 8 | 9 |
| CORDIC 200 | $x_i$ | $x_1$ | $x_2$ | $x_3$ | $x_4$ | $x_5$ | $x_6$ | $x_7$ | $x_8$ | $x_9$ | $x_{10}$ |
| | word width | 13 | 14 | 17 | 19 | 19 | 19 | 19 | 19 | 19 | 19 |
| CORDIC 400 | $x_i$ | — | $x_1$ | $x_2$ | $x_3$ | $x_4$ | $x_5$ | $x_6$ | $x_7$ | $x_8$ | $x_9$ |
| | word width | — | 14 | 16 | 18 | 18 | 18 | 18 | 18 | 18 | 18 |

The output phase 504 is calculated using one or more lookup tables 510, 512 and 514, using the sign bits of the y coordinates to address the entries in the lookup tables. For each iteration, the y sign bit or rotation direction is recorded and passed to the final phase and magnitude calculating stage 516. Again, because of the coordinate conversion 416, the angle rotation direction in the skipped first iteration is positive, and a corresponding angle rotation compensation value 520, or a $\tan(\frac{1}{2})$, is added to the angle rotation values 522, 524 and 526 from the lookup tables 510, 512 and 514. In the example of FIG. 4, ten iteration directions, which are expressed by a y sign bit array, are used to look up the phase result from the pre-calculated tables 510, 512 and 514. In this case, two 16-entry lookup tables 510 and 512 and one 4-entry lookup table 514 are implemented to optimize the timing. In other embodiments, other numbers of tables or table entry depths may be used, including a single lookup table. The angle rotation compensation value 520 and the angle rotation values 522, 524 and 526 from the lookup tables 510, 512 and 514 are combined in an adder 530.

Each entry in the first 16-entry lookup table 510 that receives sign(y[4:1]) 532 is hard coded as sign(y[1])* a $\tan(2^{-2})$+sign(y[2])*a $\tan(2^{-3})$+sign(y[3])*a $\tan(2^{-4})$+sign(y[4])*a $\tan(2^{-5})$. Each entry in the second 16-entry lookup table 512 that receives sign(y[8:5]) 534 is hard coded as sign(y[5])*a $\tan(2^{-6})$+sign(y[6])*a $\tan(2^{-7})$+sign(y[7])*a $\tan(2^{-8})$+sign(y[8])*a $\tan(2^{-9})$. Each entry in the 4-entry lookup table 514 that receives sign(y[10:9]) 536 is hard coded as) sign(y[9])*a $\tan(2^{-10})$+sign(y[10])*a $\tan(2^{-11})$.

The result 540 from adder 530 is processed in phase rounding and correction block 542 based on coordinate conversion information 544, compensating for the quadrant conversion 220 that converted the initial input 216 so that $x_0$ and $y_0$ are both positive and $x_0 > y_0$. Generally, phase rounding and correction block 542 compensating for the quadrant conversion 220 by applying the following algorithm: step 1: if (abs(y)>abs(x)) intermediate phase 1=90 degree−CORDIC output; else intermediate phase 1=CORDIC output; step 2: if (sign(x) not equal to sign(y)) intermediate phase 2=360 degree−intermediate phase 1; else intermediate phase 2=intermediate phase 1; step 3: if (x<0 and y>0) output phase=intermediate phase 2−180 degree; else if (x<0 and y<0) output phase=intermediate phase 2+180 degree; else output phase=intermediate phase 2.

Figure 5:
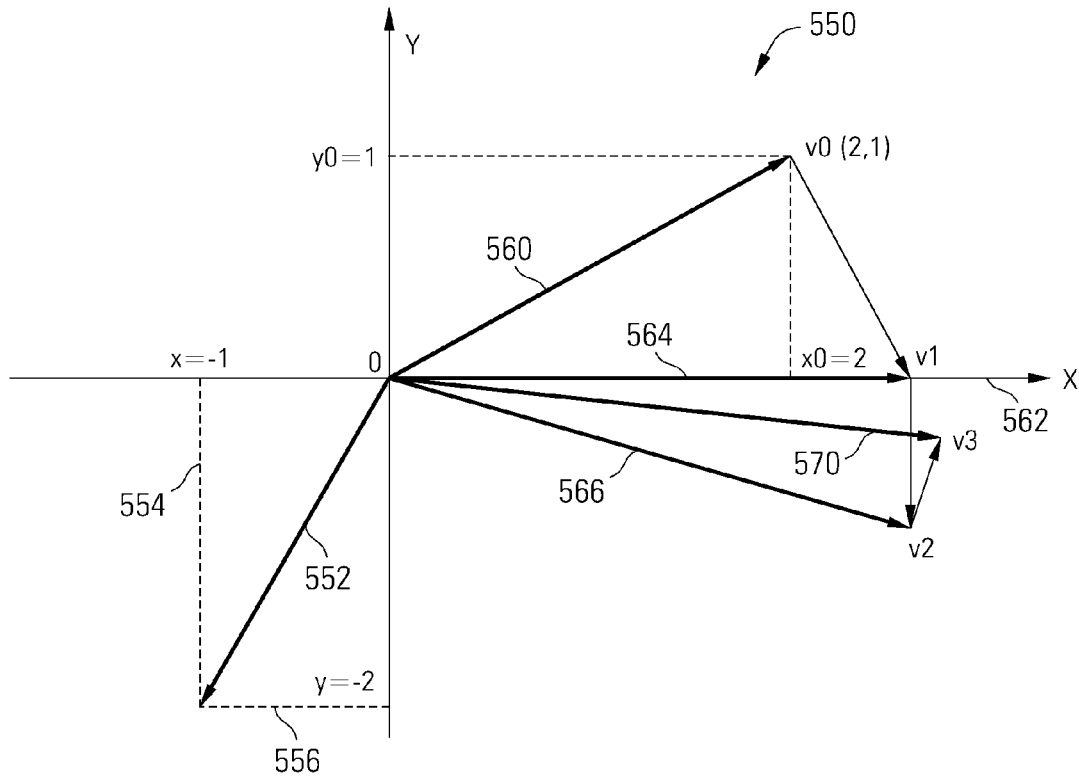
FIG. 5 depicts example vector rotations performed in the area efficient pipelined vectoring mode CORDIC of FIG. 4.

Turning to FIG. 5, a graph 550 depicts the first three vector rotations performed in an example case in the area efficient pipelined vectoring mode CORDIC 400 of FIG. 4. Taking the same example as in FIG. 3, the input vector 552 has an initial x coordinate 554 of −1 and an initial y coordinate 556 of −2. The coordinate conversion 416 maps the vector 552 to one with positive $x_0$, $y_0$ and $x_0 > y_0$, resulting in this case in vector $v_0$ 560 of ($x_0$, $y_0$)=(2, 1), by taking the absolute value of the initial x and y coordinates and swapping the x and y values.

After the coordinate conversion 416, iterations are performed to rotate the vectors toward the X axis 562 using equations 7 and 8, but in this embodiment recording the angle rotation directions (or y-coordinate signs) rather than calculating and accumulating the angle rotation values. The first iteration 422 yields vector $v_1$ 564 as (2.5, 0.0), the second iteration 426 yields vector $v_2$ 566 as (2.5, −0.625), and the third iteration 436 yields vector $v_3$ 570 as (2.578, −0.313). (Note that although the general trend rotates the vectors closer to the X axis 562, one or more of the rotations may be farther from the X axis 562 than the previous vector. For example, vector $v_1$ 564 happens to lie on the X axis 562, and vector $v_2$ 566 does not.)

Continuing iterations would end up with $y_{10}$=−0.00156, very close to 0, and $x_{10}$=2.603756. The recorded rotation direction sequence is sign(y[10:1])=(−1, −1, +1, −1, −1, −1, −1, −1, −1, +1). The final angle is calculated by reading angle=a tan($2^{-2}$)−a tan($2^{-3}$)−a tan($2^{-4}$)−a tan($2^{-5}$)=1.52 degrees from the entry 532 sign(y[4:1])=(−1, −1, −1, +1) of the first lookup table 510, reading angle=−a tan($2^{-6}$)−a tan($2^{-7}$)−a tan($2^{-8}$)+a tan($2^{-9}$)=−1.45 degrees from the entry 534 sign(y[8:5])=(+1, −1, −1, −1) of the second lookup table 512, and reading angle=−a tan($2^{-10}$)−a tan($2^{-11}$)=−0.09 degrees from the entry 536 sign(y[10:9])=(−1, −1) of the third lookup table 514. The resulting three values from the lookup tables 510, 512 and 514 and the constant a tan(½) 520 are added to yield final angle 504 of 26.5+1.52−1.45−0.09=26.48 before rounding and correction in phase rounding and correction block 542. After compensating for the coordinate conversion information 544 the final angle for the vector (−1, −2) is (90−26.48)−180=−116.48 degrees. The magnitude for the vector (−1, −2) is K*$x_{10}$=0.858785*2.603756=2.2361, a value very close to $\sqrt{1 \times 1 + 2 \times 2}$.

In the area efficient pipelined vectoring mode CORDIC 400, the rotation index starts from 1 and the angle is summarized using the recorded angle rotation directions. Assuming there are 2 iterations in each pipeline stage, only 1+3+5+7+10=26 DFFs are needed to record the angle rotation directions which are denoted as sign(y[1]) 434, sign(y[3:1]) 450, sign(y[5:1]) 464, sign(y[7:1]) 480, sign(y[10]) 490 and sign(y[9:1]) 496 in FIG. 4. Again, because the first iteration with angle=45 degrees is removed, K becomes smaller, thus less bits are needed for the intermediate variables. Also, because the angle is summarized from the lookup table(s) and no intermediate angles are needed, the DFFs for the intermediate angles are avoided and only a few rotation direction bits are recorded.

Figure 6:
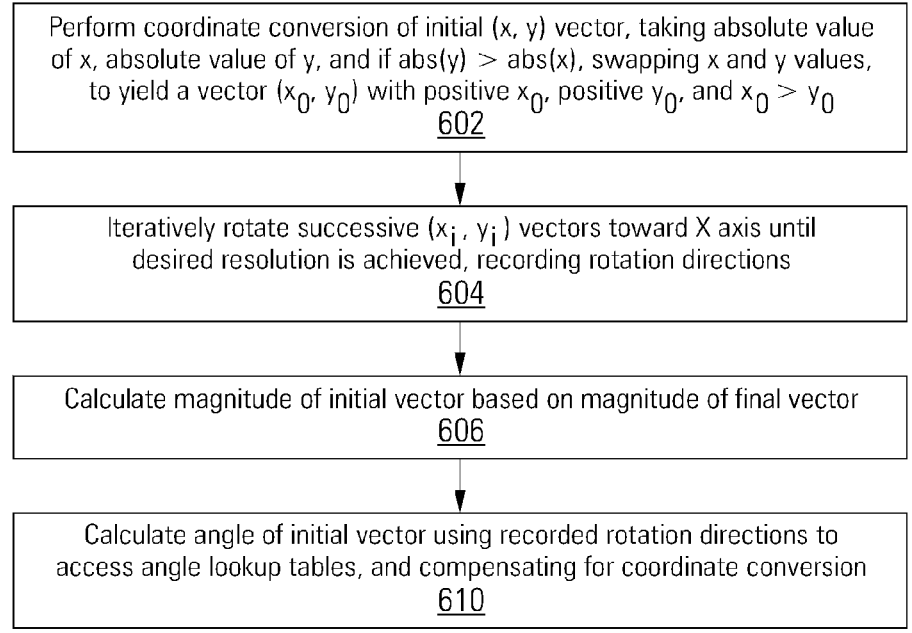
FIG. 6 depicts a flow chart of a method for performing calculations in an area efficient pipelined vectoring mode CORDIC.

Turning to FIG. 6, a flow diagram 600 depicts a method for performing calculations in an area efficient pipelined vectoring mode CORDIC. Following flow diagram 600, the CORDIC performs a coordinate conversion of an initial (x, y) vector, taking the absolute values of x and y, and if abs(y)>abs(x), swapping x and y values, yielding a vector ($x_0$, $y_0$) with positive $x_0$, positive $y_0$, and $x_0$ is greater than (or equal to) $y_0$. (Block 602) The CORDIC iteratively rotates successive ($x_i$, $y_i$) vectors toward a reference direction such as the X axis until the desired resolution is achieved, recording rotation directions as vectors are rotated. (Block 604) Again, not every rotation results in a vector that is closer to the X axis, although the general trend is to rotate toward the X axis. The number of pipeline stages in the pipelined vectoring mode CORDIC may be predetermined based on the desired resolution in the resulting phase and magnitude values, with rotations continuing until every pipeline stage is complete. The magnitude of the initial vector is calculated based on the magnitude of the final vector. (Block 606) The angle of the initial vector is calculated using the recorded rotation directions to access angle lookup tables, and compensating for the coordinate conversion. (Block 610) The method may also include adding +a tan(½) to the angles from angle lookup tables before compensating for coordinate conversion.

Figure 7:
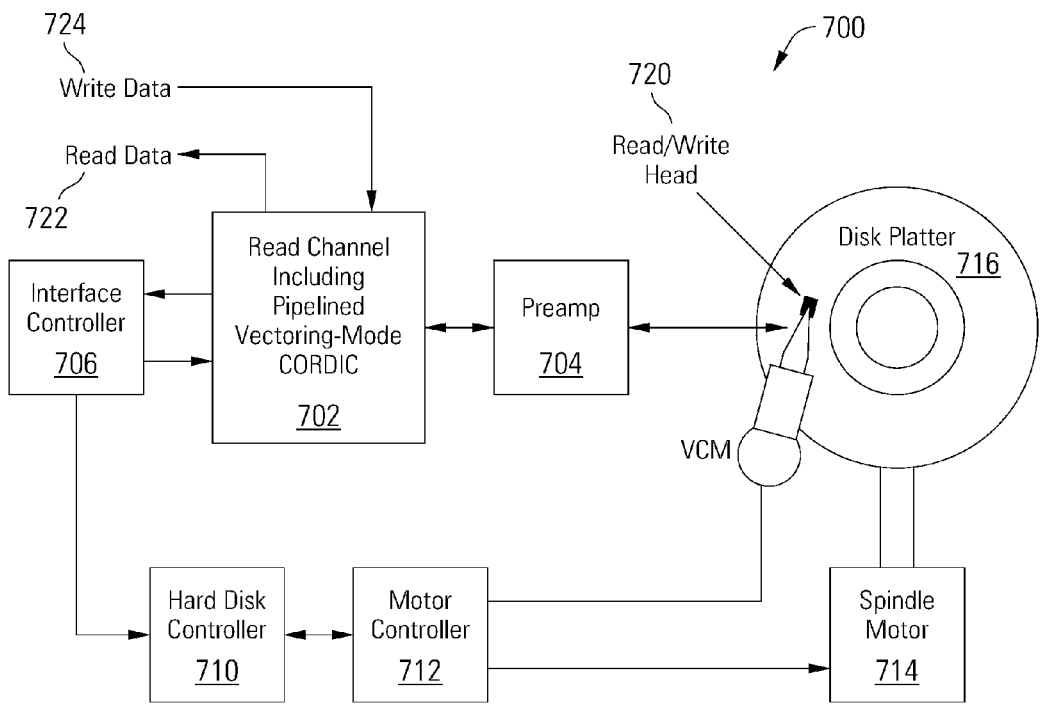
FIG. 7 depicts a storage system including an area efficient pipelined vectoring mode CORDIC.
Figure 8:
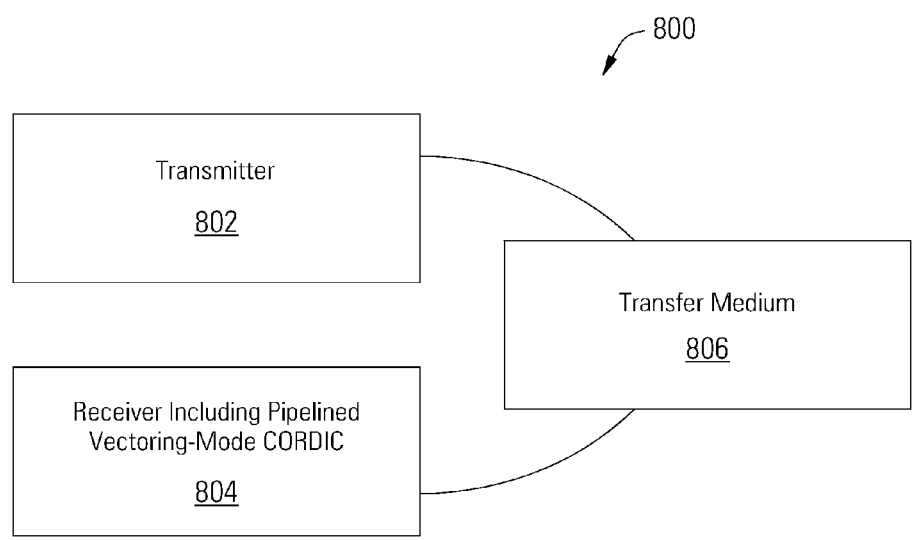
FIG. 8 depicts a wireless communication system including an area efficient pipelined vectoring mode CORDIC.

Although the pipelined vectoring mode CORDIC disclosed herein is not limited to any particular application, several examples of applications are illustrated in FIGS. 7 and 8 that benefit from embodiments of the present invention. Turning to FIG. 7, a storage system 700 is illustrated as an example application of a pipelined vectoring mode CORDIC (e.g., 400) in accordance with some embodiments of the present inventions. The storage system 700 includes a read channel circuit 702 with a pipelined vectoring mode CORDIC in accordance with some embodiments of the present invention. Storage system 700 may be, for example, a hard disk drive. Storage system 700 also includes a preamplifier 704, an interface controller 706, a hard disk controller 710, a motor controller 712, a spindle motor 714, a disk platter 716, and a read/write head assembly 720. Interface controller 706 controls addressing and timing of data to/from disk platter 716. The data on disk platter 716 consists of groups of magnetic signals that may be detected by read/write head assembly 720 when the assembly is properly positioned over disk platter 716. In one embodiment, disk platter 716 includes magnetic signals recorded in accordance with either a longitudinal or a perpendicular recording scheme.

In a typical read operation, read/write head assembly 720 is accurately positioned by motor controller 712 over a desired data track on disk platter 716, using the pipelined vectoring mode CORDIC in motor controller 712 to perform calculations used to position/write head assembly 720. Motor controller 712 both positions read/write head assembly 720 in relation to disk platter 716 and drives spindle motor 714 by moving read/write head assembly 720 to the proper data track on disk platter 716 under the direction of hard disk controller 710. Spindle motor 714 spins disk platter 716 at a determined spin rate (RPMs). Once read/write head assembly 720 is positioned adjacent the proper data track, magnetic signals representing data on disk platter 716 are sensed by read/write head assembly 720 as disk platter 716 is rotated by spindle motor 714. The sensed magnetic signals are provided as a continuous, minute analog signal representative of the magnetic data on disk platter 716. This minute analog signal is transferred from read/write head assembly 720 to read channel circuit 702 via preamplifier 704. Preamplifier 704 is operable to amplify the minute analog signals accessed from disk platter 716. The pipelined vectoring mode CORDIC may also be used in digital phase-lock-loops (DPLLs) used to process the analog signal. In turn, read channel circuit 702 decodes and digitizes the received analog signal to recreate the information originally written to disk platter 716. This data is provided as read data 722 to a receiving circuit. A write operation is substantially the opposite of the preceding read operation with write data 724 being provided to read channel circuit 702. This data is then encoded and written to disk platter 716.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Turning to FIG. 8, a wireless communication system 800 or data transmission device including a receiver 804 with a pipelined vectoring mode CORDIC is shown in accordance with some embodiments of the present inventions. Communication system 800 includes a transmitter 802 that is operable to transmit encoded information via a transfer medium 806 as is known in the art. The encoded data is received from transfer medium 806 by receiver 804. Receiver 804 incorporates a pipelined vectoring mode CORDIC, for example in a DPLL used in processing received data.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel apparatuses and methods for processing data in a pipelined vectoring mode CORDIC. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A coordinate rotation digital computer comprising:
    a coordinate converter operable to yield a converted vector based on an input vector, wherein an x coordinate value of the converted vector is positive, a y coordinate value of the converted vector is positive, and the x coordinate value is greater than or equal to the y coordinate value;
    a pipeline of vector rotators in an integrated circuit operable to perform a series of successive rotations of the converted vector to yield a rotated vector and to store rotation directions of the series of successive rotations; and
    at least one lookup table operable to yield an angle of rotation based on the rotation directions.

2. The coordinate rotation digital computer of claim 1, wherein the coordinate converter comprises at least one absolute value generator operable to yield an absolute value of an input vector x coordinate and an absolute value of an input vector y coordinate, and a comparator operable to compare the absolute value of the input vector x coordinate and the absolute value of the input vector y coordinate.

3. The coordinate rotation digital computer of claim 2, wherein the coordinate converter is operable to swap the absolute value of the input vector x coordinate and the absolute value of the input vector y coordinate when the absolute value of the input vector y coordinate is greater than the absolute value of the input vector x coordinate.

4. The coordinate rotation digital computer of claim 1, wherein the vector rotators each comprise at least one shifter and at least one adder.

5. The coordinate rotation digital computer of claim 1, wherein the rotation directions comprise one bit for each of the rotations and wherein each bit of the rotation direction adds an angle component performed during a corresponding vector rotation to the angle of rotation yielded by the at least one lookup table.

6. The coordinate rotation digital computer of claim 1, further comprising a plurality of registers in the pipeline of vector rotators operable to store a plurality of intermediate rotated vectors.

7. The coordinate rotation digital computer of claim 6, wherein the plurality of registers in the pipeline of vector rotators are operable to store the rotation directions, wherein the rotation directions comprise y coordinate signs of the intermediate rotated vectors.

8. The coordinate rotation digital computer of claim 1, further comprising a magnitude calculator operable to scale a rotated vector x coordinate to yield a magnitude of the input vector.

9. The coordinate rotation digital computer of claim 1, further comprising a phase calculator operable to calculate an angle of the input vector based on the angle of rotation from the at least one lookup table.

10. The coordinate rotation digital computer of claim 9, wherein the phase calculator comprises an adder operable to add a $\tan(\frac{1}{2})$ to the angle of rotation from the at least one lookup table.

11. The coordinate rotation digital computer of claim 9, further comprising a phase correction circuit operable to adjust the calculated angle of the input vector based on an operation performed by the coordinate converter.

12. The apparatus of claim 1, wherein the first filter, the second filter, the combining circuit and the data detector are implemented as an integrated circuit.

13. The apparatus of claim 1, wherein the apparatus is incorporated in a storage device.

14. The apparatus of claim 1, wherein the apparatus is incorporated in a storage system comprising a redundant array of independent disks.

15. The apparatus of claim 1, wherein the apparatus is incorporated in a transmission system.

16. A method for processing data in a coordinate rotation digital computer, comprising:
    performing a coordinate conversion of an input vector x coordinate and an input vector y coordinate to yield a converted vector in which a converted vector x coordinate is greater than or equal to a converted vector y coordinate and in which the converted vector x coordinate and the converted vector y coordinate are both positive;
    repeatedly rotating the converted vector in a pipeline of vector rotators in an integrated circuit toward a reference direction to yield a final vector, recording a direction of rotation of each rotation;
    calculating a magnitude of the input vector based on a final vector magnitude; and calculating an angle of the input vector based on the direction of rotation of each of the rotations using at least one angle lookup table.

17. The method of claim 16, wherein calculating the angle of the input vector further comprises compensating for the coordinate conversion.

18. The method of claim 17, wherein calculating the angle of the input vector further comprises adding a tan(½) to an output of the at least one angle lookup table.

19. The method of claim 16, wherein recording the direction of rotation of each rotation comprises storing a sign bit of a y coordinate associated with corresponding rotation.

20. A storage system comprising:
a storage medium maintaining a data set;
a read/write head assembly operable to sense the data set on the storage medium and to provide an analog output corresponding to the data set;
a motor controller operable to position the read/write head assembly; and
a coordinate rotation digital computer in the motor controller operable to perform calculations while positioning the read/write head assembly, comprising:
a coordinate converter operable to yield a converted vector based on an input vector, wherein an x coordinate value of the converted vector is positive, a y coordinate value of the converted vector is positive, and the x coordinate value is greater than or equal to the y coordinate value;
a pipeline of vector rotators operable to perform a series of successive rotations of the converted vector to yield a rotated vector and to store rotation directions of the series of successive rotations; and
at least one lookup table operable to yield an angle of rotation based on the rotation directions.

* * * * *